United States Patent [19]
Krongos

[11] 3,822,018
[45] July 2, 1974

[54] WATER FILTER DEVICE
[76] Inventor: Zaharias Krongos, 128 Sherman Ave., New York, N.Y. 10034
[22] Filed: June 28, 1973
[21] Appl. No.: 374,628

[52] U.S. Cl................ 210/323, 210/420, 210/424, 210/449, 210/451
[51] Int. Cl............................................. B01d 35/02
[58] Field of Search .......... 210/323, 282, 284, 340, 210/420, 424, 434, 449, 451

[56] References Cited
UNITED STATES PATENTS
512,931   1/1894   Aims, Jr............................. 210/323
2,532,177  11/1950  Maunula........................... 210/424

*Primary Examiner*—Frank A. Spear, Jr.
*Attorney, Agent, or Firm*—Millen, Raptes & White

[57] ABSTRACT

A water filter adapted to be attached to faucets. The filter comprises a plurality of cylindrical filter elements annularly arranged within two generally hemispherical sections joined together. The device comprises valve means for directing tap water through the filter elements and also for directing the water through the device unfiltered.

5 Claims, 8 Drawing Figures

PATENTED JUL 2 1974  3,822,018

WATER FILTER DEVICE

BACKGROUND OF THE INVENTION

This invention relates to water filters of the type adapted to be attached onto faucets to filter and clarify water, and is especially adapted for domestic uses in the home or office.

Water obtained from faucets in the home, etc. is normally pure and potable. However, in view of today's pollution problems with rivers and streams, water obtained from municipal water purification systems through faucets in the home may contain certain undesirable impurities and odors. It is desirable to remove these impurities and ordors from the water and the device of this invention accomplishes the desired result.

BRIEF SUMMARY OF THE INVENTION

An object of this invention is to provide a filter device having a casing adapted to be attached to a faucet and whereby said casing contains a plurality of replaceable filtering elements.

Another object of this invention is to provide a filter device comprised of two substantially hemispherical sections which are adapted to be joined together as a unit containing filtering elements, which is inexpensive to manufacture, and which will operate efficiently with minimal maintenance.

A further object of this invention is to provide a filter device having a casing formed of substantially hemispherical sections and containing therein a plurality of individual cylindrical filter elements containing filtering material.

DETAILED DESCRIPTION OF THE INVENTION

The above objects and advantages of the filter device and construction herein will be better understood by reference to the accompanying drawings depicting an embodiment of the invention wherein.

Figure 8:
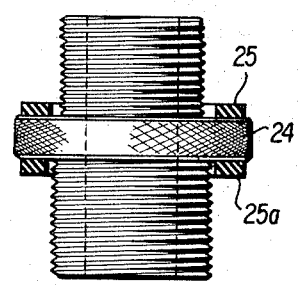
FIG. 8 is a side view of a fitting adapted to be used with the filter device.
Figure 6:
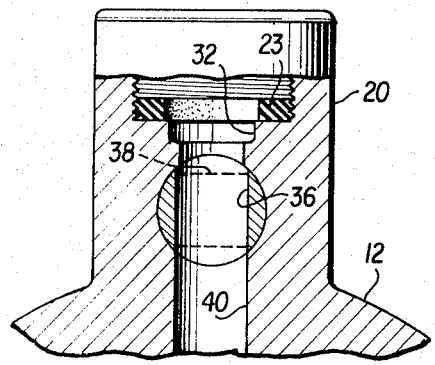
FIG. 6 is a sectional view taken along line 6—6 of FIG. 3.

Referring now to the drawings, the numeral 10 denotes generally the filter device of the invention. The device comprises two substantially hemispherical sections 12 and 14 which are joined together to form a casing by conventional means such as screw threads 16 and 18 and gaskets (not shown) providing a water tight joint. The upper end of section 12 is provided with connecting means 20 adapted to be connected as by threading 22 and gasket 23 to a faucet 11 having external threads. In the event the faucet has internal threads, a conventional fitting 24 (FIG. 8) with gaskets 25 and 25a may be used to adapt the filter device to the faucet. It is understood, however, that the filter device and connecting means 20 can have external threading if desired.

Section 12 comprises within connecting means 20, a central passageway 32 which directs incoming water into the filter device. A valve 34 comprises a transverse member 35 having a transverse member 35 having a pair of holes 36 and 38 disposed at a right angle to each other within the connecting means. The valve 34 is provided with suitable gaskets such as 37 and 39 to prevent leakage of water from the casing and other gaskets (not shown) between holes 36 and 38 to prevent leakage of water therebetween. Section 12 also comprises passageways 40 and 42 which align with holes 36 and 38 respectively. A chamber 41 is provided within section 12 bounded by transverse member 43 which comprises a plurality of holes 45 which communicate with chamber 41. A dam 44 is disposed within the chamber and comprises a hole 40a aligned with passageway 40. The hole 40a in dam 44 along with passageway 40 when aligned with hole 36 in valve 34 provides a continuous passageway for tap water passing unfiltered through the filter device.

The lower section 14 comprises an outlet opening 56 through which filtered or unfiltered water passes and a shoulder 60.

Within the two sections 12 and 14 when joined together, a plurality of filter elements 26 having flanges 27 are provided. The elements are disposed therein by means of retainer gaskets 28 and 30. Gasket 28 has a central opening 50 and a plurality of holes 46 adapted to align with holes 45 in member 43. Gasket 30 has a central opening 54 and a plurality of holes 52. Each hole 52 is provided with a shoulder 53.

Figure 3:
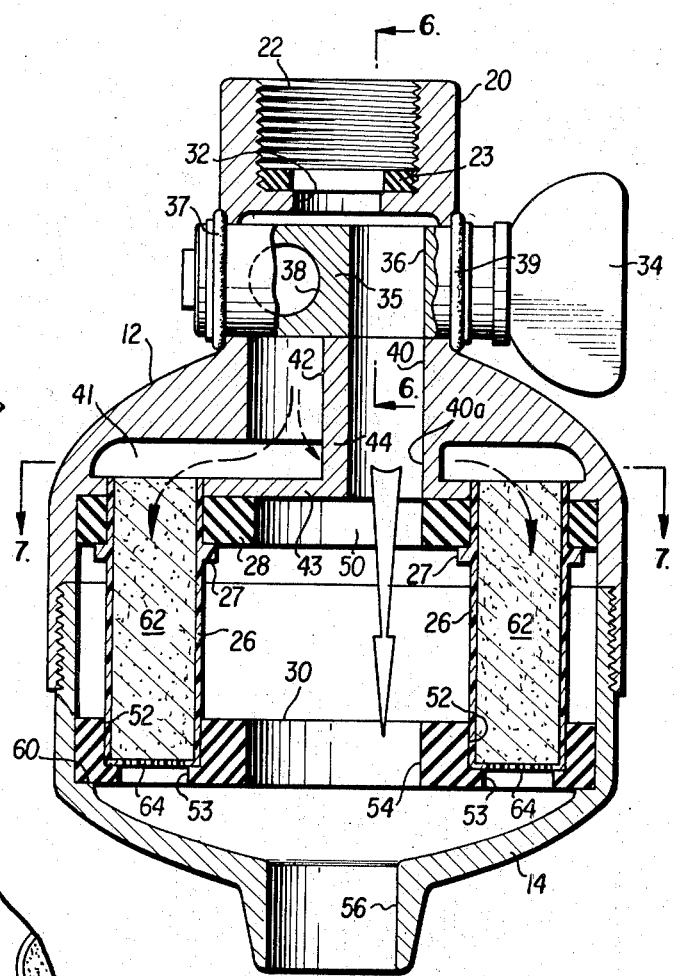
FIG. 3 is a side sectional view of the filter device.
Figure 7:
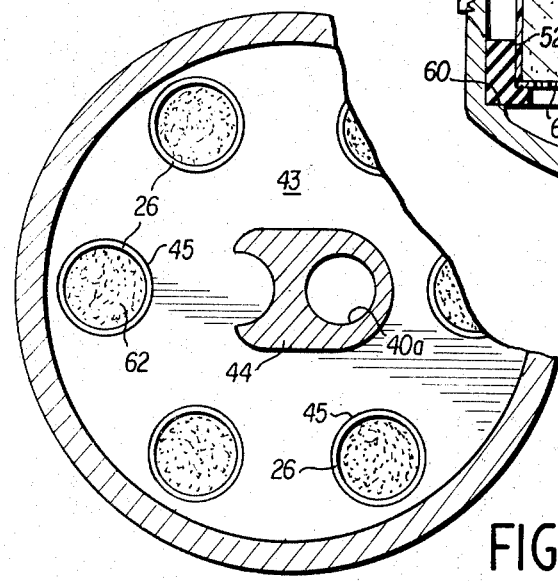
FIG. 7 is a sectional view taken along line 7—7 of FIG. 3.

The filter elements are assembled within the casing as shown in FIG. 3. Each filter element is disposed and held in place within the respective holes 45, 46, and 52. Flanges 27 abut against the gasket 28 and the bottom of the filter element rests on shoulder 53 of gasket 30. Gasket 30 rests on shoulder 60 of section 14.

Figure 1:
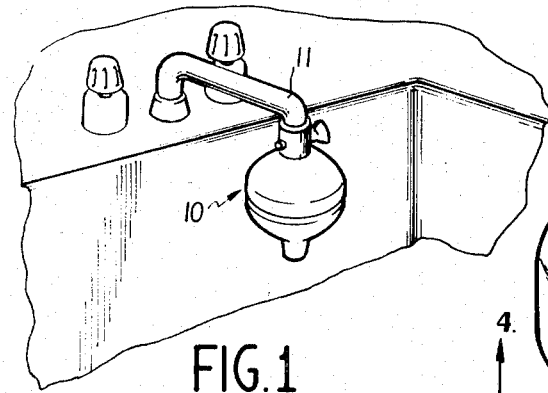
FIG. 1 is a perspective view of the filter device of this invention installed on a faucet.
Figure 4:
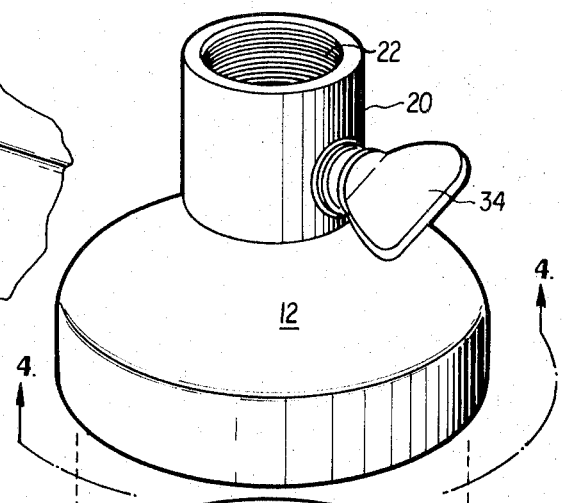
FIG. 4 is a perspective view taken along line 4—4 of FIG. 2.
Figure 4:
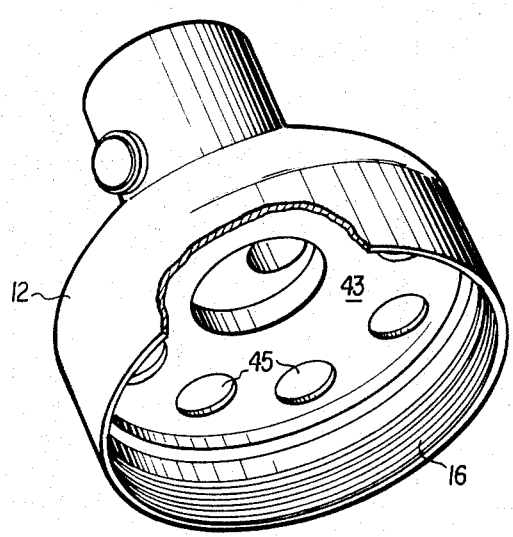
Figure 5:
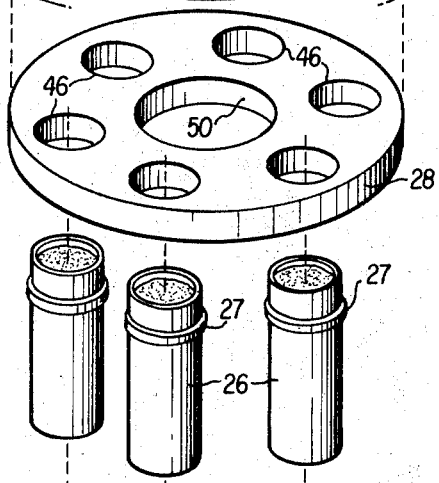
FIG. 5 is a perspective view of one of the filter elements.
Figure 5:
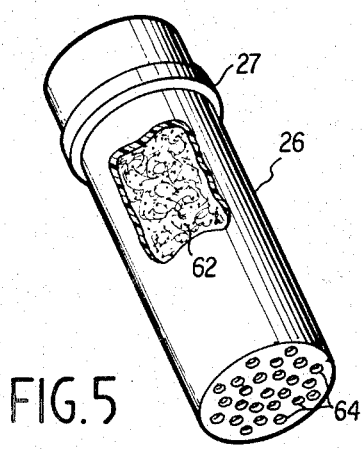
Figure 2:
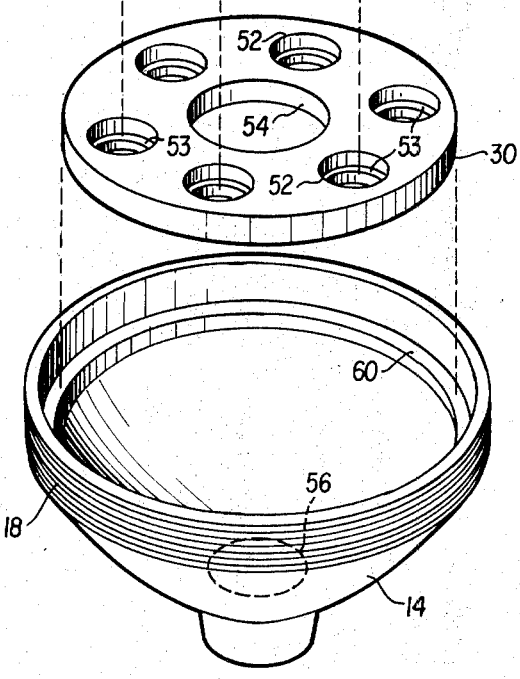
FIG. 2 is an exploded view of the filter device.

Each filter element 26 (FIG. 5) is filled with a filter material 62. Particularly suitable is natural wool. Other materials suitable are activated charcoal, cork, and the like and particularly mixtures thereof with natural wool. The element 26 is open at the top end and has a plurality of small holes 64 at the bottom end which retain the filter material but permit passage of water.

In use, the filter device 10 is attached to a faucet 11 of the like and when the faucet is turned on, water will pass through passageway 32 in connecting means 20 into section 12. If the unit is not desired to be used for filtering the water, valve 34 is turned to align hole 36 with passageway 40 and 40a of dam 44. In this position of the valve, water passes through the interior of the device through holes 50 and 54 of the gaskets and discharages through passageway 56.

When it is desired to filter the water, valve 34 is turned to align hole 38 with passageway 42. As water flows through passageway 42, it encounters dame 44 which diverts the water annularly within cavity 41. Water then flows through the filter material 62 of the filters 26 and out holes 52 and discharge passageway 56. In use, it was found that the water was adequately filtered such that it was completely clarified, had no odor, and contained no sediment when natural wool was particularly used.

The filter device can be easily constructed of metal or plastic materials and can be detachably connected to the usual types of faucets in kitchen sinks, laundry tubs, wash bowls, etc., in homes, offices, etc.

Whenever the filter materials 62 become clogged or unusable for purifying and filtering of the tap water, the filter device can be disassembled and the filter elements 26 replaced with new elements.

From the foregoing description, one skilled in the art can easily ascertain the essential characteristics of the invention, and without departing from the spirit and scope thereof, can make various changes and modifications of the invention to adapt it to various usages and conditions.

What is claimed is:

1. A filter device for filtering tap water to remove odors and impurities therefrom comprising:
   a. a top member and a bottom member comprising a lower discharge passageway adapted to be detachable connected together to form a casing for an enclosed space adapted to contain a plurality of filter elements;
   b. said top member comprising a central passageway in an upper inlet connecting member adapted to be fitted to a faucet and the like, a valve member disposed transversely within said connecting member disposed between said central passageway and first and second parallel lower passageways, said valve member comprising two holes disposed 90° to each other and each adapted to be aligned with one of said parallel lower passageways when said valve is turned;
   c. a chamber disposed below said parallel passageways comprising a dam member which includes a central hole therein adapted to direct water from said first passageway through said filter device unfiltered, said second passageway adapted to direct water annularly within said chamber and around said dam member;
   d. a transverse member below said chamber and integral with said dam member comprising a plurality of annular holes;
   e. an upper transverse retainer member disposed within said bottom member and comprising a plurality of annular holes and a central hole;
   f. a lower transverse retainer member disposed within said bottom member and comprising a plurality of annular holes which include shoulder means and a central hole;
   g. a plurality of filter elements disposed longitudinally within said casing and retained therein within said annular holes of said transverse member and said upper and lower retainer members;
   h. said filter element having an open top and a plurality of lower openings adapted to retain a filter material within said element; whereby when one hole of said valve is aligned with said second parallel passageway, flowing water will be diverted annularly within said chamber and through said filter elements.

2. The filter device of claim 1 wherein said filter elements comprises an upper flange.

3. The filter device of claim 1 wherein said top and bottom members comprise annular inner shoulders adapted to abut said retainer members.

4. The filter device of claim 1 wherein said filter material comprises lambs wool.

5. The filter device of claim 1 where said filter material comprises crushed cork.

* * * * *